Figure 1:
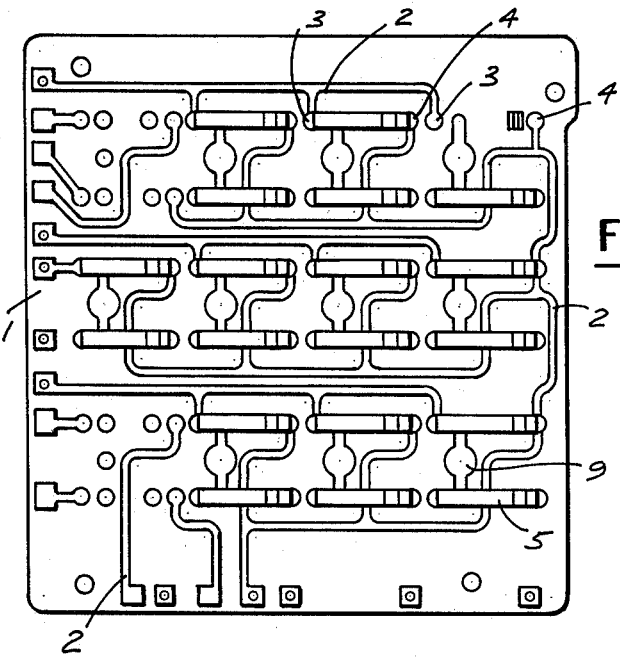

June 8, 1965    J. F. RUGSTEN    3,188,435
CONTACT DEVICE FOR PRINTED CIRCUITS
Filed Nov. 1, 1962

INVENTOR.
JOHAN FREDRIK RUGSTEN
BY Hanes and Nydick
ATTORNEYS

United States Patent Office 3,188,435
Patented June 8, 1965

3,188,435
CONTACT DEVICE FOR PRINTED CIRCUITS
Johan Fredrik Rugsten, Copenhagen, Denmark, assignor to Telefonaktiebolaget L M Ericsson, Stockholm, Sweden, a corporation of Sweden
Filed Nov. 1, 1962, Ser. No. 234,728
Claims priority, application Denmark, Nov. 7, 1961, 4,421
4 Claims. (Cl. 200—166)

The present invention refers to a contact device for circuits that consist of flat conductors on an insulating plate, and in which a number of circuit points located on a straight line, by means of movable contacts are to be connected to and disconnected from a corresponding number of other circuit points equally located on a straight line.

Circuits of this type are used especially in form of printed circuits in many instruments and systems of modern electrotechnic, and it is an important object to obtain contact devices that constitute a natural supplement to the technics of printed circuits, which specifically means that the devices have to be as flat as possible, i.e. occupy the least possible space perpendicularly to the insulating plate carrying the printed circuits, and that their connections to the conductors and their mounting should to the least possible extent require the use of conventional contact wiring connections, respectively mechanical connection means, so that the contact device does not constitute a hindrance to the compact construction design facilitated by the use of printed and similar circuits with flat conductors.

It is an object of the invention to obtain a contact device that as far as possible fulfills these requirements and at the same time is simple and inexpensive to produce and mount in multiple production.

The invention is specially characterized by the movable contacts being designed as spring reeds, each one of which extends in an arc between the two points of the circuits that are to be connected, and is bent in an open loop at an intermediate point, which loop is brought through a hole in the plate, a pin of insulating material being passed on the reverse side of the plate through the loops of the reeds located in a straight line, which pin by the spring force of the reeds is held pressed against said reverse side of the plate. Although it is usually convenient to use a single insulating pin for a plurality of reed loops located in a straight line it is, of course, also possible to provide an individual pin for each reed loop.

By this design a very flat construction of the contact device is obtained, and the connection between the printed circuits and the reed contacts consist in simple pressure contacts, wherein the contact pressure is obtained by means of the spring force of the reeds themselves. Furthermore, the reeds are held mechanically in place by means of their own spring force, that causes friction between the insulating pin and the side of insulating plate. The forces causing the contact pressure and the mechanical holding are, thus, the action and reaction of the same spring force, and the mechanical holding of the spring reeds does not require any other mounting operation than the introduction of the insulating pin through the loops of the reeds, an operation that usually is not carried out individually for each reed, but simultaneously for a whole row of reeds.

Figure 2:
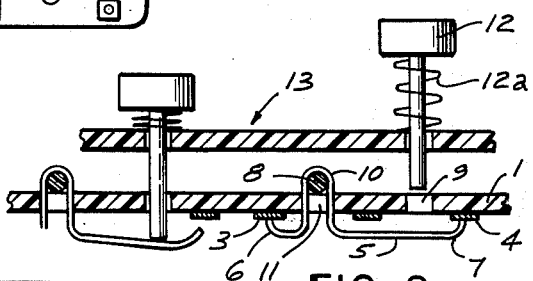
Figure 3:
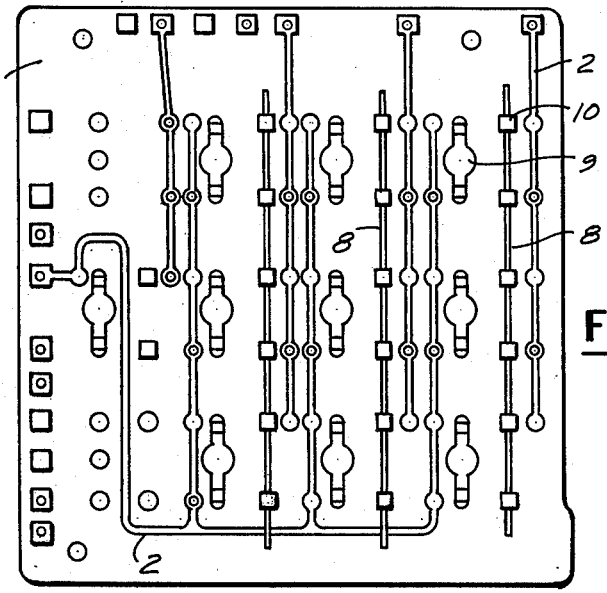

As an example of the use of the contact device according to the invention a push-button set for number sending from a telephone instrument will be described. It is known to provide such a push-button set with two groups of crossed conductors that, by pressing different buttons, are connected in different combinations. The contact device here described is specially designed and adequate for this use, but may naturally be used in many other fields as well wherein the same requirements exist. The embodiment of the contact device is in the following described with reference to the attached drawing, on which FIG. 1 shows a view of the front side of a plate of insulating material with a printed circuit and a contact device according to the invention, FIG. 2 is a fragmentary cross-sectional view of the plate, and FIG. 3 shows a view of the reverse side of the plate.

In the drawing reference figure 1 indicates an insulating plate, on which a circuit system is printed, the conductors of which are indicated by reference number 2. On the other side of the insulating plate another printed circuit is provided, the conductors of which are crossing the conductors of the first-mentioned side and at predetermined terminal contacts are connected to these through holes in the plate, for instance, by means of an electrolytic procedure. Such two-sided printed circuits are known per se. With 3 is indicated a row of contacts of the printed circuit that are to be connected and disconnected in desired combinations to another row of contacts 4. At the contacts 3 and 4 of the printed circuits circular conductor surfaces are provided, and in order to obtain contact connection between each pair of corresponding contacts 3 and 4 respectively, a springy reed 5 is provided, that extends in an arc between said two terminal contacts. The arc form is conveniently produced by giving the reed spring two pronounced bends 6 and 7 in the neighbourhood of respective ends. In the interspace between the one contact and the other the spring reed may, if required, cross one or more printed conductors as shown. Each one of the reeds is provided with an open loop 10 that is brought through a hole 11 of the plate. On the reverse side an insulating pin 8 is passed through all the loops of the reeds. This insulating pin is retained by the spring force of the reeds against the side of the plate, so that it is held in position by means of friction.

The insulating plate 1 has a row of holes 9 through which the pins 12a of spring-loaded buttons 12 of the push-button set 13 may directly actuate the spring reeds to interrupt the contact between said reeds and the contacts 3 of the printed circuit. With this design the contact device is well adapted for the use in combination with a push-button set for number-sending in telephone instruments.

I claim:

1. A switching device for a printed circuit board bearing on one side a circuit pattern including several terminal contacts, said switching device comprising an insulation board bearing a circuit pattern including terminal contacts and having at least two holes therethrough, a contact spring including a substantially U-shaped loop intermediate the ends of the spring, said loop extending through a first one of said holes from the side of the board bearing said circuit pattern and protruding on the opposite side of the board, an insulation member extending through the protruding loop portion to anchor the spring in the board, each end of said spring being biased into contact engagement with one of said terminal contacts, thereby connecting the two engaged contacts, and a lengthwise displaceable push-button pin protruding through the second hole and into engagement with a branch of the spring extending between the loop thereof and the respective end of the spring, whereby displacement of the pin toward the spring disengages said spring end from the respective contact terminal.

2. A switching device according to claim 1, wherein at least one of the branches of the spring formed by the spring portions between the loop and the ends of the spring is outwardly curved in reference to said board to bridge a terminal contact located on the board underneath said bridge.

3. A switching device according to claim 1, wherein a row of said first holes in said board and a plurality of contact springs corresponding to the number of said holes are provided, each of said holes having inserted therein the loop of one of said contact springs, and wherein a common insulation member is extended through the protruding portions of all said loops to anchor the loops in the holes.

4. A switching device according to claim 3, wherein said contact springs are disposed in parallel relationship.

References Cited by the Examiner
UNITED STATES PATENTS
2,039,957    5/36    Hall _____ 200—11

BERNARD A. GILHEANY, *Primary Examiner.*